(12) United States Patent
Zhu et al.

(10) Patent No.: US 9,873,197 B2
(45) Date of Patent: Jan. 23, 2018

(54) METHOD FOR PROCESSING INFORMATION AND ELECTRONIC DEVICE

(71) Applicant: Lenovo (Beijing) Co., Ltd., Beijing (CN)

(72) Inventors: Xiaotian Zhu, Beijing (CN); Yan Gao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 97 days.

(21) Appl. No.: 14/757,404

(22) Filed: Dec. 23, 2015

(65) Prior Publication Data

US 2016/0375578 A1    Dec. 29, 2016

(30) Foreign Application Priority Data

Jun. 25, 2015    (CN) .......................... 2015 1 0359539

(51) Int. Cl.
| | |
|---|---|
| *B25J 9/00* | (2006.01) |
| *B25J 9/16* | (2006.01) |
| *B25J 11/00* | (2006.01) |
| *B25J 13/08* | (2006.01) |
| *B25J 19/02* | (2006.01) |

(52) U.S. Cl.
CPC .............. *B25J 9/0003* (2013.01); *B25J 9/163* (2013.01); *B25J 11/001* (2013.01); *B25J 11/0005* (2013.01); *B25J 11/008* (2013.01); *B25J 11/0015* (2013.01); *B25J 13/08* (2013.01); *B25J 19/023* (2013.01); *G05B 2219/35444* (2013.01); *G05B 2219/40099* (2013.01); *G05B 2219/40411* (2013.01)

(58) Field of Classification Search
CPC ................ G06K 9/00369; G05B 19/00; G05B 2219/163; H04W 4/12; H04W 88/02; H04W 8/183
USPC .......................................... 700/94, 245, 253
See application file for complete search history.

(56) References Cited

U.S. PATENT DOCUMENTS

| | | | |
|---|---|---|---|
| 9,075,416 B2 * | 7/2015 | Ichikawa | ............... B25J 9/1676 |
| 9,358,685 B2 * | 6/2016 | Meier | .................... B25J 9/1602 |
| 9,434,074 B2 * | 9/2016 | Tanigawa | ............. G05D 1/0212 |
| 9,597,805 B2 * | 3/2017 | Bender | ................. B25J 11/009 |

* cited by examiner

*Primary Examiner* — Dalena Tran
(74) *Attorney, Agent, or Firm* — Harness, Dickey & Pierce, P.L.C.

(57) ABSTRACT

A method for processing information and an electronic device are provided, in order to improve the performance of response of an electronic device. The method includes: obtaining environmental information of a current environment; determining, based on the environmental information, a first operation instruction corresponding to the electronic device and an execution parameter corresponding to the first operation instruction, where the execution parameter is a parameter selected among at least two execution parameters corresponding to the first operation instruction; and controlling the electronic device to perform a first operation corresponding to the first operation instruction based on the execution parameter.

17 Claims, 4 Drawing Sheets

METHOD FOR PROCESSING INFORMATION AND ELECTRONIC DEVICE

CROSS-REFERENCE TO RELATED APPLICATIONS

This application claims priority to Chinese Patent Application No. 201510359539.0 titled "METHOD FOR PROCESSING INFORMATION AND ELECTRONIC DEVICE", filed with the Chinese Patent Office on Jun. 25, 2015, which is hereby incorporated by reference in its entirety.

FIELD

The present disclosure relates to the field of electronics technology, and in particular to a method for processing information and an electronic device.

BACKGROUND

With the continuous development of science and technology, the electronics technology also develops quickly. An electronic device has greatly improved performances and appearance and becomes an essential part of study and life. A user may do more and more work with the electronic device, for example, the user may watch a video, listen to music or play a game through an electronic device connected to the network.

Presently, when using an electronic device, the user generally needs to send a corresponding control command to the electronic device, such as direct operation or usage of a remote control, in order to control the electronic device to perform a corresponding instruction. For example, when using a domestic robot, the user may direct the domestic robot through a manual setting or wireless remote control, and the domestic robot performs corresponding operations after receiving control information, such as automatically cleaning, collecting dust or memorizing a path. Most of the electronic devices perform an operation in response to only a unique instruction.

SUMMARY

A method for processing information and an electronic device are provided according to embodiments of the disclosure.

A method for processing information is provided. The method includes:

obtaining environmental information of a current environment;

determining, based on the environmental information, a first operation instruction corresponding to an electronic device and an execution parameter corresponding to the first operation instruction, wherein the execution parameter is a parameter selected among at least two execution parameters corresponding to the first operation instruction; and controlling the electronic device to perform a first operation corresponding to the first operation instruction based on the execution parameter.

Optionally, determining, based on the environmental information, the first operation instruction corresponding to the electronic device and the execution parameter corresponding to the first operation instruction, includes:

parsing first information in the environmental information;

obtaining first data information and second data information corresponding to the first information;

determining, based on the first data information, a first operation instruction corresponding to the environmental information; and determining, based on the second data information, the execution parameter corresponding to the first operation instruction.

Optionally, the first information is sound information corresponding to a first user in the current environment. Determining, based on the second data information, the execution parameter corresponding to the first operation instruction, includes:

determining, based on the second data information, a mood of the first user; and selecting, based on the mood of the first user, an execution parameter matching the mood of the first user among the at least two execution parameters as the execution parameter corresponding to the first operation instruction.

Optionally, determining, based on the environmental information, the first operation instruction corresponding to the electronic device and the execution parameter corresponding to the first operation instruction, includes:

obtaining, through a first sensor, first information of the current environment, and determining the first operation instruction corresponding to the electronic device; and obtaining, through a second sensor, second information of the current environment, and selecting, based on the second information, the execution parameter corresponding to the first operation instruction among the at least two execution parameters.

Optionally, the first information is information of an operation performed on the electronic device by a first user in the current environment, which is obtained through the first sensor, and the second information is portrait information corresponding to the first user obtained through the second sensor.

Obtaining, through the first sensor, the first information of the current environment, and determining the first operation instruction corresponding to the electronic device, includes:

determining, based on the information of the operation, the first operation instruction corresponding to the electronic device.

Selecting, based on the second information, the execution parameter corresponding to the first operation instruction among the at least two execution parameters, includes:

determining, based on the portrait information, a state of the first user, and selecting, based on the state of the first user, the execution parameter corresponding to the first operation instruction among the at least two execution parameters.

Optionally, selecting, based on the second information, the execution parameter corresponding to the first operation instruction among the at least two execution parameters, includes:

determining, based on the second information, a relative distance between a first identifier in the current environment and a first user in the current environment, wherein the first identifier is used to represent an object with a preset symbol or shape in the current environment; and if the relative distance is determined to be greater than a preset distance, selecting a first execution parameter among the at least two execution parameters as the execution parameter corresponding to the first operation instruction; otherwise, selecting a second execution parameter among the at least two execution parameters as the execution parameter corresponding to the first operation instruction;

wherein a value corresponding to the first execution parameter is less than a value corresponding to the second execution parameter.

Optionally, controlling the electronic device to perform the first operation corresponding to the first operation instruction based on the execution parameter includes:

controlling a multimedia output device of the electronic device to perform an output operation corresponding to the first operation instruction based on the execution parameter.

Optionally, the execution parameter comprises a speed parameter.

Controlling the electronic device to perform the first operation corresponding to the first operation instruction based on the execution parameter includes:

controlling at least a part of the electronic device to perform the first operation corresponding to the first operation instruction based on the speed parameter in the execution parameter.

Optionally, controlling at least a part of the electronic device to perform the first operation corresponding to the first operation instruction based on the execution parameter includes:

controlling a motion device of the electronic device to perform, relative to a support surface for the electronic device, a movement operation corresponding to the first operation instruction, based on the speed parameter.

An electronic device is provided. The electronic device includes:

a housing;

a sensor which is provided outside the housing and configured to obtain environmental information of a current environment; and a processor which is provided inside the housing, connected to the sensor, and configured to receive and process the environmental information, determine a first operation instruction corresponding to the electronic device, select an execution parameter among at least two execution parameters corresponding to the first operation instruction as an execution parameter corresponding to the first operation instruction, and control the electronic device to perform a first operation corresponding to the first operation instruction based on the execution parameter.

Optionally, the sensor includes a first sensor and a second sensor;

the first sensor is configured to obtain first information of the current environment;

the second sensor is configured to obtain second information of the current environment; and the processor is configured to determine the first operation instruction corresponding to the electronic device based on the first information, and determine the execution parameter corresponding to the first operation instruction based on the second information.

Optionally, the electronic device further includes:

a multimedia output device, which is connected to the processor and configured to output information corresponding to the first operation instruction based on the execution parameter.

Optionally, the electronic device further includes:

a motion device, which is connected to the processor and configured to perform the first operation corresponding to the first operation instruction based on the execution parameter.

Optionally, the motion device is configured to perform, relative to a support surface for the electronic device, a movement operation, based on a speed parameter in the execution parameter.

An electronic device is provided. The electronic device includes:

an obtaining module, configured to obtain environmental information of a current environment;

a determining module, configured to determine, based on the environmental information, a first operation instruction corresponding to the electronic device and an execution parameter corresponding to the first operation instruction; and an execution module, configured to control the electronic device to perform a first operation corresponding to the first operation instruction based on the execution parameter.

DETAILED DESCRIPTION OF THE EMBODIMENTS

A method for processing information and an electronic device are provided according to the embodiments of the present disclosure. The method includes: obtaining environmental information of a current environment; determining, based on the environmental information, a first operation instruction corresponding to the electronic device and an execution parameter corresponding to the first operation instruction, where the execution parameter is a parameter selected among at least two execution parameters corresponding to the first operation instruction; and controlling the electronic device to perform a first operation corresponding to the first operation instruction based on the execution parameter.

According to the embodiments of the present disclosure, an electronic device may obtain environmental information corresponding to a current environment, a first operation instruction corresponding to the electronic device and an execution parameter corresponding to the instruction may be determined through analyzing the environmental information, and the electronic device is controlled to perform a first operation corresponding to the first operation instruction based on the execution parameter. Since the execution parameter is a parameter selected among at least two execution parameters corresponding to the first operation instruction based on the environmental information, a different execution parameter may be selected among the at least two execution parameters as an execution parameter uniquely corresponding to the operation instruction based on different environmental information. For example, when a domestic robot is controlled to perform a movement operation in response to a following instruction, if it is determined based on the environmental information that the user has an emergency requirement, an execution parameter with a larger value for a speed parameter among the at least two execution parameters may be selected as an execution parameter corresponding to the following instruction. Otherwise, an execution parameter with a smaller value for the speed parameter among the at least two execution parameters may be selected as the execution parameter corresponding to the following instruction. Thus the domestic robot may determine a movement speed based on the environmental condition when performing a movement operation, and user experience is improved.

In order to make objectives, technical solutions and advantages of the embodiments of the present disclosure clearer, the technical solutions according to the embodiments of the present disclosure are described clearly and completely in conjunction with drawings hereinafter. Apparently, the described embodiments are only a part of rather than all of the embodiments of the present disclosure. All other embodiments obtained based on the embodiments of the present disclosure by those skilled in the art without any creative work fall within the scope of protection of the present disclosure.

According to the embodiments of the present disclosure, the electronic device may be a domestic robot, a notebook computer, a tablet computer PAD, or a mobile phone or the like. According to the embodiments of the present disclosure, the domestic robot is taken as an example for the electronic device.

Optionally, according to the embodiments of the present disclosure, a first sensor may be a sensor provided in the electronic device, such as a sensing device provided on a body of the electronic device, or the first sensor may be a sensing device provided in the environment, which may be connected to the electronic device, or the first sensor may be a sensor provided in other electronic devices such as a wearable electronic device connected to the electronic device. For example, the electronic device may be connected to a smart watch, and may obtain user data such as temperature and heart rates of the user collected through the smart watch by means of wireless transmission such as Bluetooth or network.

Optionally, according to the embodiments of the present disclosure, a second sensor may be an image sensor such as a camera or a sound sensor such as a microphone provided within the electronic device. In practical applications, the second sensor may be alternatively provided on a housing of the electronic device, such as a face, a stomach or a back of the domestic robot.

According to the embodiments of the present disclosure, after collecting the environmental information of the current environment, the first sensor and/or the second sensor may convert the environmental information into an electrical signal or information of other forms based on a certain rule for outputting, so that the converted environment information is transmitted to a processor of the electronic device such as a central processing unit CPU for processing.

In addition, a term "and/or" herein only describes an association between associated objects, which includes three types of relationship. For example, A and/or B may indicate: only A exists, both A and B exist, or only B exists. In addition, a character "/" herein indicates that there is a relationship of "or" between the associated objects.

Preferred embodiments of the present disclosure are illustrated in detail in conjunction with the drawings hereinafter.

Figure 1:
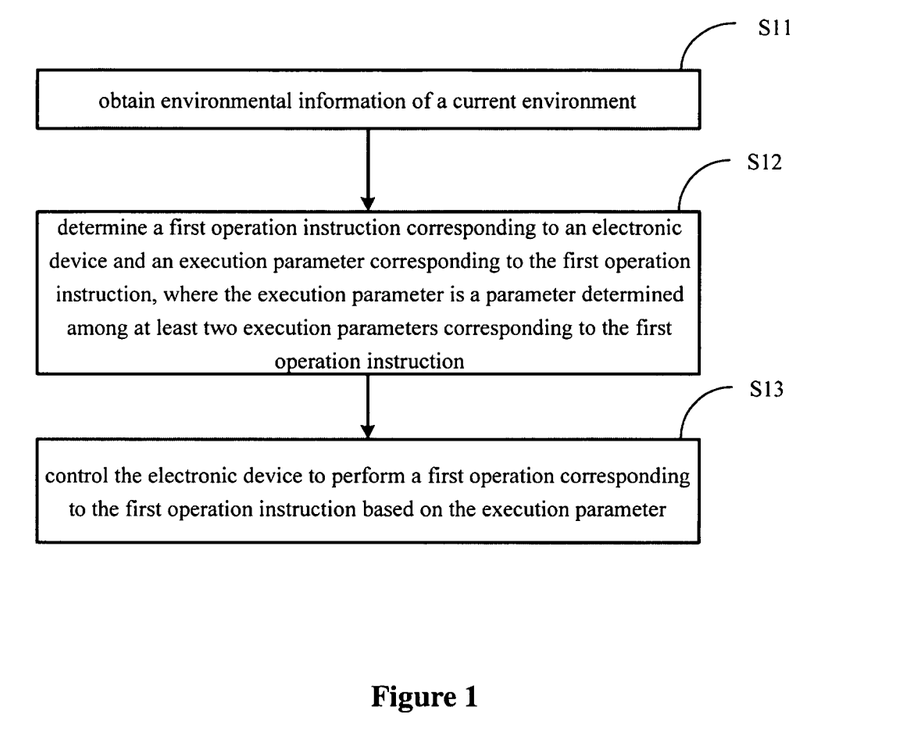
FIG. 1 is a flowchart of a method for processing information according to an embodiment of the present disclosure.

As shown in FIG. 1, a method for processing information applied to the above-mentioned electronic device is provided in the present disclosure. The method may include steps S11-S13.

In step S11, environmental information of a current environment is obtained.

According to the embodiment of the present disclosure, the current environment may refer to environmental space where the electronic device is located, such as a living room, a bedroom or an office. The environmental information may be information corresponding to the current environment collected through the electronic device, such as information about brightness or air purification of the current environment.

Specifically, in a case that there is a user in the current environment, the obtained environmental information may include information corresponding to the user, such as information about image or sound of the user.

Optionally, according to the embodiment of the present disclosure, the electronic device may obtain the environmental information through a collecting device provided in the electronic device such as a sensor, or may receive the environmental information of the current environment transmitted from other devices connected to the electronic device.

In step S12, a first operation instruction corresponding to the electronic device and an execution parameter corresponding to the first operation instruction are determined based on the environmental information; where the execution parameter is a parameter selected among at least two execution parameters corresponding to the first operation instruction.

According to the embodiment of the present disclosure, after obtaining the environmental information, the electronic device may determine the first operation instruction and the execution parameter corresponding to the first operation instruction through parsing the environmental information. The execution parameter may be a parameter for speed, noise, or the like.

Specifically, step S12 may include but is not limited to the following two ways.

A First Way

First information in the environmental information is parsed, First data information and second data information corresponding to first information are obtained, the first operation instruction corresponding to the environmental information is determined based on the first data information, and the execution parameter corresponding to the first operation instruction is determined based on the second data information.

The first information may be information in the environmental information corresponding to the current environment and/or a user. For example, the first information may be information about light in the environment, sound or image of the user, or the like. Hence, at least two pieces of data information may be obtained through parsing the first information.

For example, if the first information is the information about sound of the user, the data information obtained through parsing the first information may include information about volume, speed, voice content and so on; if the first information is the information corresponding to the current environment, information about humidity, brightness or the like corresponding to the current environment may be determined through parsing the environment information.

The first operation instruction may be an instruction corresponding to the electronic device which is determined through parsing the first information, such as a movement instruction or a cleaning instruction. The electronic device may perform a corresponding operation in response to the first operation instruction, in order to adapt to the first information of the current environment. The execution parameter may be a control parameter for an operation corresponding to the first operation instruction executed by the electronic device, such as a movement speed and a noise level.

According to the embodiment of the present disclosure, after the first data information is obtained through parsing the first information in the environmental information, a corresponding first operation instruction is determined based on the first data information, i.e., an operation to be performed by the electronic device is determined. In practical applications, the electronic device may correspond to multiple groups of control parameters when performing one operation, for example, a movement operation of the electronic device may correspond to multiple groups of speed parameters for controlling different operation speeds of the device.

Further, a control parameter corresponding to the operation may be determined based on the second data information obtained through parsing. For example, a speed parameter or a noise parameter corresponding to a movement operation performed by the electronic device is determined.

According to the embodiment of the present disclosure, if the first information is sound information corresponding to a first user in the current environment, corresponding first data information and second data information may be obtained through parsing the sound information in step S12.

Specifically, the first data information may be content corresponding to the sound information, such as "you come here", "start cleaning" and laughter "ha-ha-ha", and the second data information may be characteristic parameter information corresponding to the sound information, such as information about a volume level, a speed, and length of time.

Further, the corresponding first operation instruction may be determined based on the obtained first data information. For example, "you come here" corresponds to the movement instruction, and the laughter "ha-ha-ha" of the user corresponds to an output instruction. The output instruction may be used to control an output unit of the electronic device to output corresponding information, such as displaying an image of a smiling face or outputting sound "ha-ha-ha".

It should be noted that, in practical applications, multiple operation instructions may be determined based on the first data information, and the first operation instruction may be one of the multiple operation instructions. For example, if the first data information is determined as "start cleaning", operation instructions corresponding to the first data information may include a movement instruction and a cleaning instruction, either of which may be determined as the first operation instruction.

In addition, if the first information is sound information corresponding to the first user, determining, based on the second data information, the execution parameter corresponding to the first operation instruction may include:

determining a mood of the first user based on the second data information obtained through parsing the sound information; and selecting, based on the mood of the first user, an execution parameter matching the mood of the first user among the at least two execution parameters as the execution parameter corresponding to the first operation instruction.

Since the second data information includes the characteristic parameter information corresponding to the sound information, a current mood of the first user may be speculated based on the characteristic parameter information, such as excitement, calm, and impatience.

For example, the first operation instruction determined based on the first data information "you come here" is the movement instruction. If the volume level in the second data information indicates a loud sound of the user, e.g., a sound exceeding a certain value, and the information about speed indicates a rapid speed, it may be determined that the current mood of the user is impatient.

Further, the execution parameter corresponding to the first operation instruction may be determined based on the mood of the first user. Specifically, the execution parameter matching the current mood of the first user among the at least two execution parameters corresponding to the first operation instruction is selected as the execution parameter corresponding to the first operation instruction.

For example, after the mood of the first user is determined as impatience, an execution parameter corresponding to a larger speed parameter among the at least two execution parameters is selected as an execution parameter corresponding to the movement instruction, so that the electronic device performs a movement operation corresponding to the movement instruction at a high speed, which indicates response of the electronic device to the instruction adapts to the current mood of the first user.

A Second Way

First information of a current environment is obtained through a first sensor, and a first operation instruction corresponding to an electronic device is determined; and second information of the current environment is obtained through a second sensor, and an execution parameter corresponding to the first operation instruction among at least two execution parameters is selected based on the second information.

The first sensor and the second sensor may collect environmental information of the current environment simultaneously. For example, sound information in the environmental information is collected through the first sensor, and image information in the environmental information may be collected through the second sensor at the same time.

Alternatively, the first sensor and the second sensor may collect environmental information during a period of time, for example a period of 5 s. Information of the current environment is collected through the first sensor and the second sensor respectively, and the collected information may be used as environmental information obtained by the electronic device.

Specifically, the first information obtained through the first sensor may be environmental information of the current environment collected by a sensor connected to the electronic device, image information collected by a sensor in the current environment connected to the electronic device such as an infrared camera, or sound information collected by a sensor in the current environment connected to the electronic device such as a sound sensor. Alternatively, information of the current environment may be obtained through a sensor of another device connected to the electronic device, for example, the corresponding collected information may be obtained through a smart watch connected to the electronic device.

The second information may be environmental information obtained through the second sensor of the electronic device, such as information of a user in the current environment, which includes image information and sound information of the user.

In practical applications, after obtaining the first information and determining the first operation instruction corresponding to the first information, the electronic device may determine an execution parameter corresponding to the first operation instruction based on the second information. Since the first information and the second information are collected in similar or same periods of time, the determined operation instruction and corresponding execution parameter can match the environmental information, which meets the requirements of different scenarios.

For example, if the electronic device is a domestic robot, the obtained first information is sound information of the user, and the second information may be image information of the user, the first operation instruction is determined as an output instruction for outputting a smiling face through parsing the sound information, and an execution parameter corresponding to the output instruction determined based on the second information, i.e., the image information of the user, may be a speed parameter for controlling output of the smiling face, such as fast or slow output of the smiling face, or, the execution parameter may be a smile degree parameter for controlling the output of the smiling face, such as smile or laugh, or, the execution parameter may be a laugher parameter for controlling the output of the smiling face, such as laugher "hahaha" or mild laughter.

Specifically, in the second way, if the first information is information about an operation performed on the electronic device by a first user in the current environment, which is obtained through the first sensor, and the second information is portrait information corresponding to the first user obtained through the second sensor. Thus, the first operation instruction may be determined based on the received operation information. For example, if the user clicks on a display screen of the electronic device, the electronic device may determine a first operation instruction corresponding to the clicking operation, such as an output instruction and a movement instruction.

Further, the electronic device may determine a state of the first user through analyzing the portrait information. For example, the electronic device determines that the user is not happy currently based on image expression in the portrait information such as cry or frown, and selects an execution parameter corresponding to the output instruction among the at least two execution parameters based on the state of the user, such as fast or slow movement or rotation.

Figure 2:
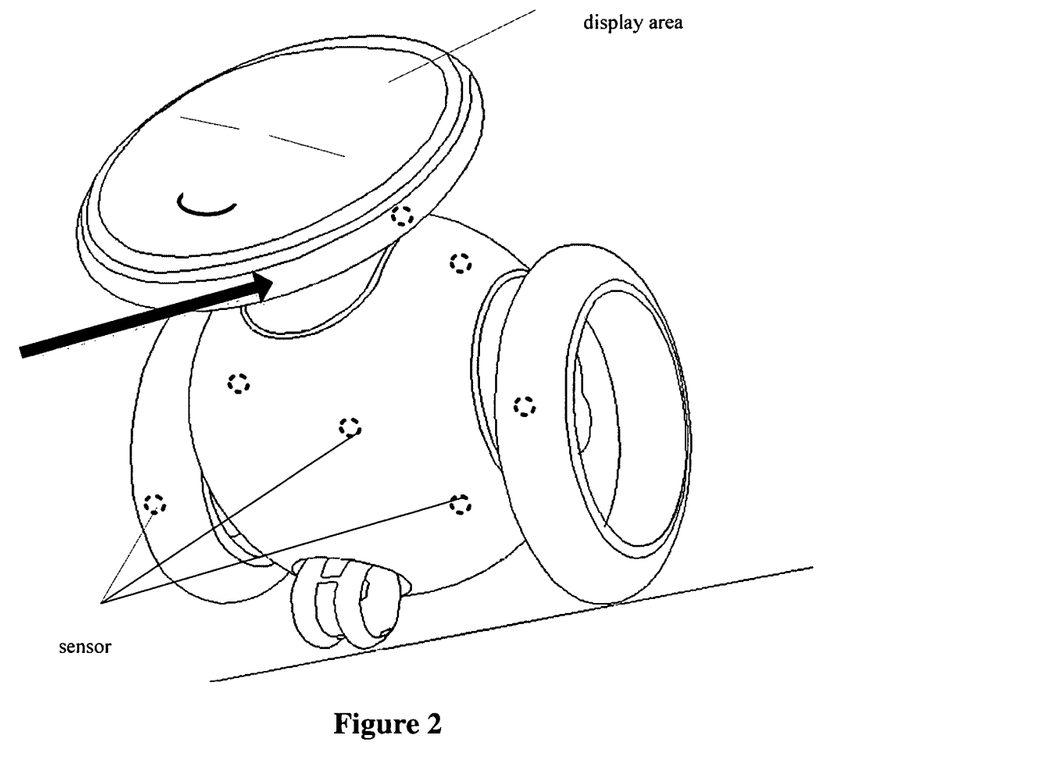
FIG. 2 is a general view of a domestic robot according to an embodiment of the present disclosure.

For example, as shown in FIG. 2, a domestic robot is taken as an example for the electronic device. Sensors for sensing touch (dotted line circles in the drawing) are installed on a face, a body (including a stomach and a back of the domestic robot) and even a scroll wheel of the domestic robot, a neck and the scroll wheel of the domestic robot are both rotatable mechanical structure, the face is a displayable area, and the body may be provided with a backlight. When the user touches the domestic robot with gestures, such as touching a jaw (shown as an arrow in the drawing) of the domestic robot, the neck of the robot makes a corresponding response, such as slightly twisting, with joyful expression such as a smiling face displayed on the screen, and even shaking the face and the scroll wheel.

Further, if portrait information detected by the domestic robot through an image sensor indicates that the user is not happy, for example, a portrait of the user shows expression of crying, or frowning, the domestic robot will appease the user through displaying expression on the screen, or will please the user through an interesting body movement, a rotation or lighting effect.

In practical applications, selecting the execution parameter corresponding to the first operation instruction among the at least two execution parameters based on the second information collected by the second sensor may further include:

determining, based on the second information, a relative distance between a first identifier in the current environment and a first user in the current environment, where the first identifier represents an object with a preset symbol or shape in the current environment; and if the relative distance is determined to be greater than a preset distance, selecting a first execution parameter among the at least two execution parameters as the execution parameter corresponding to the first operation instruction; otherwise, selecting a second execution parameter among the at least two execution parameters as the execution parameter corresponding to the first operation instruction; where a value corresponding to the first execution parameter is less than a value corresponding to the second execution parameter.

The object with the first identifier in the current environment may be a dangerous or hidden object in the current environment relative to special populations (such as children or old people), which is identified by an electronic device, such as a dangerous electrical appliance or a sharp corner of furniture. The user may mark these objects in advance and may place an identifier with a preset pattern such as an identifier of prohibition at a dangerous position. In a case that the electronic device detects an area with the identifier in the environment information, the electronic device automatically classify the area as a dangerous area.

In general, since placing of the identifier of prohibition influences beauty of a household and is complicated, the electronic device may automatically detect a possibly dangerous object in the current environment. For example, if the user marks a corner of a table, similar dangerous shapes (other sharp corners) will be marked automatically by the electronic device by default.

In practical applications, the electronic device may generate a corresponding 3D simulated image based on information of the household and a decoration structure at home obtained by scanning, and marks the object with the preset symbol or shape in the 3D simulated image, such that the relative distance between the user and the dangerous object can be determined accurately, and it is determined whether a current user is in a dangerous area, e.g., whether a child is close to a dangerous object.

Optionally, according to the embodiment of the present disclosure, the preset distance may be a safe distance which is preset in the electronic device by the user or is set before delivery of the electronic device, such as 1 m, or 0.6 m. The at least two execution parameters corresponding to the first operation instruction may be speed parameters corresponding to different values, such as 1.0 m/s, or 1.5 m/s.

For example, in a case that the domestic robot follows a child in response to a following instruction, a relative distance between the child in the current environment and a dangerous object may be estimated through determining a position of the user in a established 3D simulated image. If the distance is not less than the preset distance, it is determined that the child is within a safe range, and a speed corresponding to the domestic robot may be a normally set following speed, such as 0.5 m/s.

In a case that the relative distance is determined to be less than the preset distance, a speed parameter corresponding to a determined execution parameter for a movement instruction of the domestic robot may be a large value, such as 1.5 m/s. In this case, the domestic robot may quickly raise the speed from 0.5 m/s to 1.5 m/s, move to a position between the child and the dangerous object at 1.5 m/s and prevent the child from unceasingly approaching the dangerous object with its body or arms; meanwhile, the robot may send an alarm to prompt the child or an adult to be careful, so as to guarantee safety of the child and improve practicality of the device.

In addition, if an arm device is provided in the domestic robot, when the domestic robot prevents the child from approaching the dangerous object, the arm device may correspond to an operation instruction and a corresponding execution parameter, for example, the arm is controlled to swing up and down at a certain speed and frequency to prevent the user from passing.

In step S13, the electronic device is controlled to perform a first operation corresponding to the first operation instruction based on the execution parameter.

According to the embodiment of the present disclosure, the first operation may be an operation which can be performed by the electronic device. For example, if the electronic device is a domestic robot, the first operation may be a cleaning operation, a movement operation or an output operation (such as outputting a sound or an image).

Specifically, step S13 may include but is not limited to the following scenes.

A first scene: a multimedia output device of the electronic device is controlled to perform an output operation corresponding to the first operation instruction based on the execution parameter.

The multimedia output device may be a display screen of the electronic device. The output operation may be displaying an image on the display screen of the electronic device, such as an image of a smiling face, and/or the output operation may be controlling a sound output device of the electronic device to output corresponding information, such as information about an indicator light, music or an alarm.

For example, in a case that the user is determined to be excited currently, an image of a smiling face, or even laugher with certain volume may be outputted through the display of the domestic robot, so as to match the current mood of the user.

A second scene: at least a part of the electronic device is controlled to perform a first operation corresponding to the first operation instruction based on a speed parameter in the execution parameters.

The first operation may be an operation which can be performed by the electronic device, such as a movement operation, a rotation operation and an arm swing operation. The at least a part may be a component of the electronic device which can perform the first operation based on the execution parameter, such as a support component or a motion component.

Optionally, according to the embodiment of the present disclosure, in a case that a motion device used to move is provided in the electronic device, such as a scroll wheel, step S13 may include controlling the motion device of the electronic device to perform, relative to a support surface for the electronic device, a movement operation corresponding to the first operation instruction, based on the speed parameter.

For example, if the electronic device is a domestic robot, the first operation instruction determined based on environmental information is a movement instruction, and a value of a speed parameter in the execution parameters is 1.0 m/s, the domestic robot may move relative to the ground at 1.0 m/s in a home environment.

Optionally, according to the embodiment of the present disclosure, if the environment information changes, for example, it is detected that volume rises and a speed increases in the sound information of the user, it may be speculated that the user is impatient currently, and the electronic device needs to speed up the operation, i.e., an execution parameter with a larger value of speed parameter among the at least two execution parameters may be selected as the execution parameter corresponding to the first operation instruction.

In practical applications, the at least two execution parameters corresponding to the first operation instruction may also include a noise parameter. In general, a speed is directly proportional to noise when the electronic device moves, and the quicker the device operates, the greater the corresponding power consumption and generated heat quantity are, thus a fan for heat dissipation whirls faster, and more noise is caused. Hence, in a case that the first operation instruction is a movement instruction, the execution parameter corresponding to the movement instruction may be further determined based on a state of the user determined through the second information.

For example, if it is determined that the user is in a sleep state, the electronic device may be controlled to move at a speed corresponding to a smaller value of the parameter, in order to reduce the noise of the device. When executing an emergency instruction, for example, it is detected that the user is close to a dangerous object, the domestic robot may stop the user behavior at a fastest motion speed, without considering a noise level, which makes the device smart and humane. The motion speed may be a moving speed of a leg portion (such as a scroll wheel) of the domestic robot, or a speed at which an arm of the domestic robot swings or grasps an object if the arm is provided in the domestic robot.

In practical applications, if it is determined that the user is in a sleep state, the electronic device may be controlled to delay execution of the first operation corresponding to the first operation instruction. For example, at a first moment, the user sends a cleaning instruction to control the domestic robot to clean, and if the domestic robot detects that the user is in the sleep state when specifying the cleaning instruction, the domestic robot may delay execution time corresponding to the cleaning instruction automatically, such as a delay of 0.5 hour, or even delay execution of the cleaning instruction until it is detected that the user wakes up, so as to avoid that noise in the cleaning operation influences the user rest.

Figure 3:
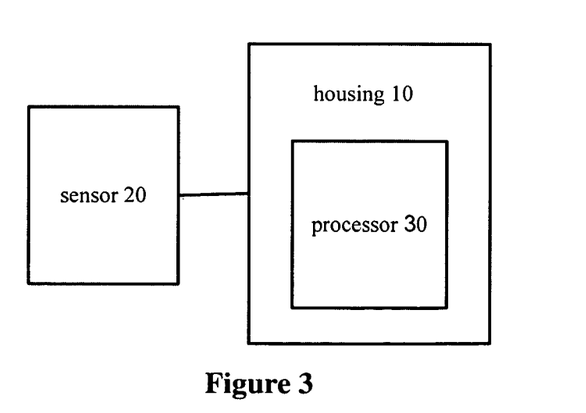
FIG. 3 is a structural block diagram of an electronic device according to an embodiment of the present disclosure.

As shown in FIG. 3, based on a same inventive concept, an electronic device is provided in the disclosure. The electronic device includes a housing 10, a sensor 20 and a processor 30.

The housing 10 is configured to protect a body of the electronic device mainly, and may be made of a material with good crash resistance and stain resistance, such as an alloy and plastic. The housing 10 may cover a main body of the electronic device, such as a stomach and a back of a robot.

The sensor 20 may be provided outside the housing, and may be configured to obtain environmental information of a current environment where the electronic device is located.

The processor 30 may be provided inside the housing 10, and may be connected to the sensor 20. The processor 30 is configured to receive and process the environmental information, determine a first operation instruction corresponding to the electronic device, select an execution parameter among at least two execution parameters corresponding to the first operation instruction, and control the electronic device to perform a first operation corresponding to the first operation instruction based on the execution parameter.

According to the embodiment of the present disclosure, the electronic device may further include a multimedia output device and a motion device. The multimedia output device may be connected to the processor 30, and is configured to output information corresponding to the first operation instruction based on the execution parameter, for example, the multimedia output device may output an image of a smiling face, background music or the like based on the first operation instruction.

The motion device may also be connected to the processor 30, and is configured to perform the first operation corresponding to the first operation instruction based on the execution parameter.

Figure 4A:
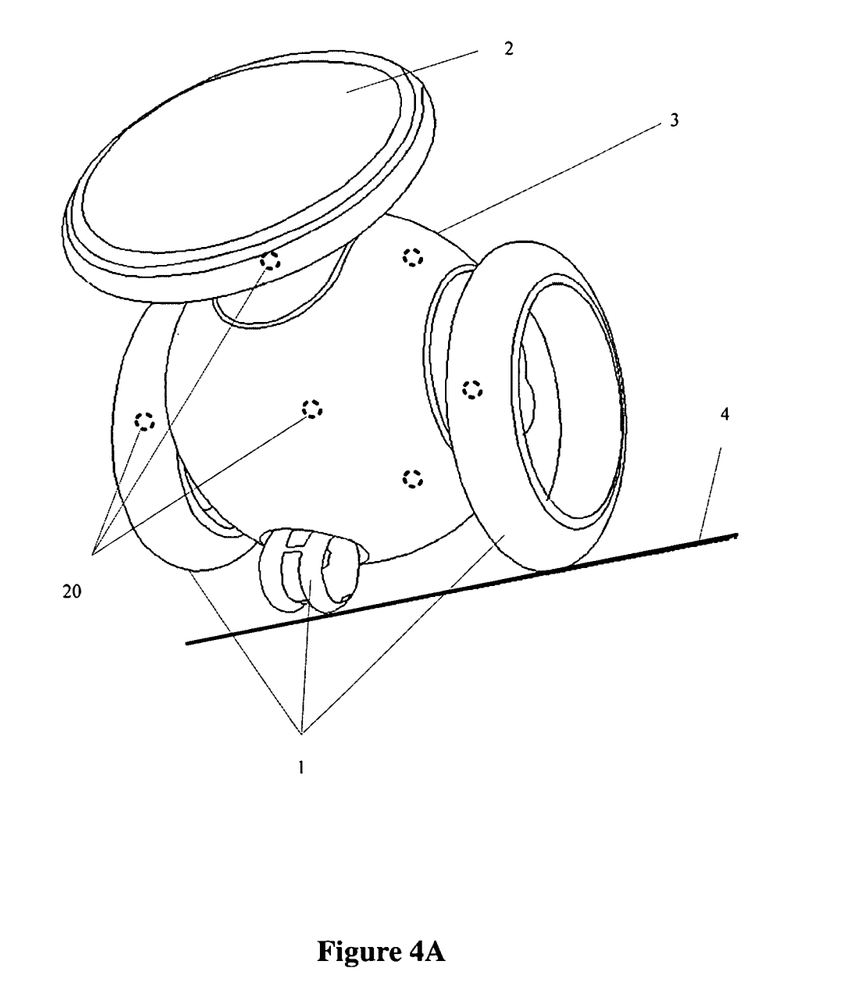
FIG. 4A is a front view of a domestic robot according to an embodiment of the present disclosure.

According to the embodiment of the present disclosure, the electronic device may be a domestic robot. FIG. 4A shows a front view of the domestic robot, where a number 1 represents a scroll wheel of the robot corresponding to the motion device of the electronic device, a number 2 represents a face of the domestic robot (a display screen) corresponding to a multimedia output device of the electronic device, a number 3 represents a body of the domestic robot (including a stomach and a back of the robot), and a number 4 represents a support surface, such as the ground. Sensors 20 for sensing touch may be installed on the body and face to obtain environmental information of a current environment.

Figure 4B:
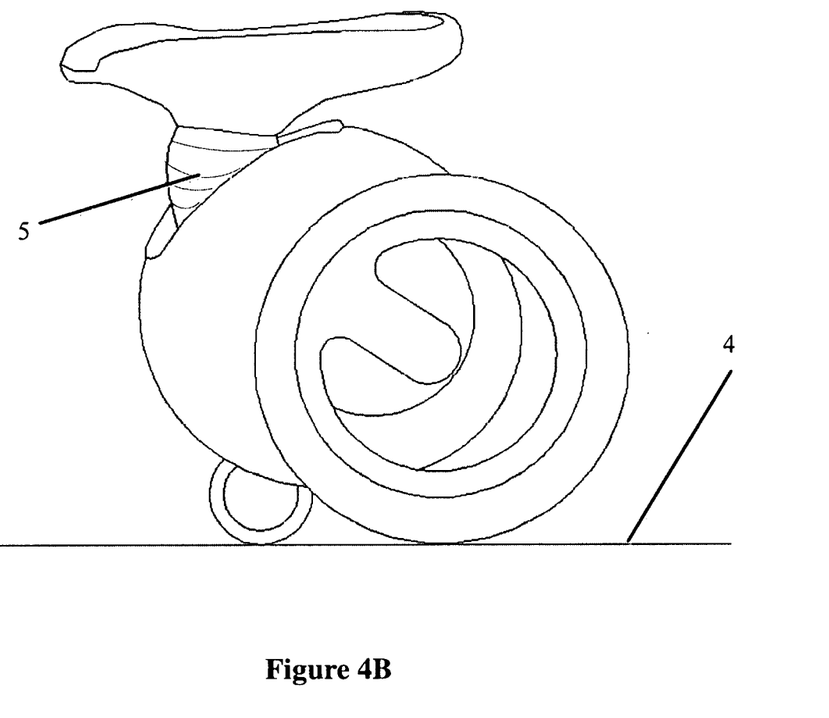
FIG. 4B is a side view of a domestic robot according to an embodiment of the present disclosure.

Specifically, a connection component between the face and the body of the robot (a neck) and the scroll wheel are both rotatable mechanical structures, as shown in FIG. 4B. FIG. 4B is a side view of the domestic robot, where a number 4 represents a support surface for the domestic robot, and a number 5 represents a connection component between the face and the body. The face of the domestic robot may flexibly shake relative to the body through the connection component, and the scroll wheel connected to the body (i.e., the motion device) can support the body and moves relative to the support surface.

In practical applications, components such as a processor 30 may be provided within the body of the domestic robot, and the domestic robot may move relative to the ground (i.e., the support surface) through the scroll wheel. Of course, the motion device of the electronic device may also include an arm, a leg and so on, which may perform a corresponding operation such as shaking the arm or kicking.

For example, when the user touches the domestic robot with gestures, such as touching a jaw of the robot, the neck of the robot makes a corresponding response, such as slightly twisting of the body, with joyful expression such as a smiling face displayed on the screen.

Optionally, according to the embodiment of the present disclosure, the sensors 20 may include a first sensor and a second sensor, where the first sensor may be configured to obtain first information of the current environment, and the second sensor may be configured to obtain second information of the current environment Further, the processor 30 may be configured to determine a first operation instruction corresponding to the electronic device based on the first information, and determine an execution parameter corresponding to the first operation instruction based on the second information.

Figure 5:
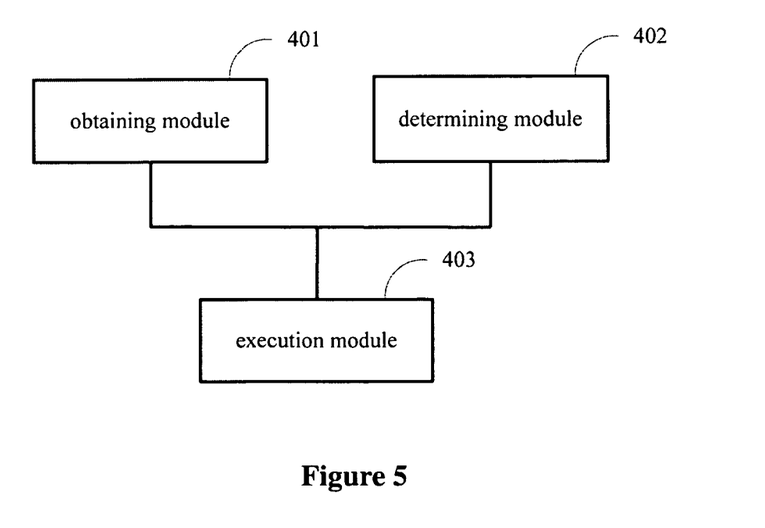
FIG. 5 is a structural diagram of an electronic device according to an embodiment of the present disclosure.

Referring to FIG. 5, based on a same inventive concept, an electronic device is provided in the disclosure. The electronic device includes an obtaining module 401, a determining module 402 and an execution module 403.

The obtaining module 401 may be configured to obtain environmental information of a current environment.

The determining module 402 may be configured to determine, based on the environmental information, a first operation instruction corresponding to the electronic device and an execution parameter corresponding to the first operation instruction; where the execution parameter is a parameter selected among at least two execution parameters corresponding to the first operation instruction.

The execution module 403 may be configured to control the electronic device to perform a first operation corresponding to the first operation instruction based on the execution parameter.

Optionally, according to the embodiment of the present disclosure, the determining module 402 may be configured to:

parsing first information in the environmental information;

obtaining first data information and second data information corresponding to the first information;

determining a first operation instruction corresponding to the environmental information based on the first data information; and determining an execution parameter corresponding to the first operation instruction based on the second data information.

Optionally, according to the embodiment of the present disclosure, if the first information is sound information corresponding to a first user in the current environment, the determining module 402 may be further configured to:

determine a mood of the first user based on the second data information; and select, based on the mood of the first user, an execution parameter matching the mood of the first user among the at least two execution parameters as the execution parameter corresponding to the first operation instruction.

Optionally, according to the embodiment of the present disclosure, the determining module 402 may be further configured to:

obtain first information of the current environment through a first sensor, and determine a first operation instruction corresponding to the electronic device; and obtain second information of the current environment through a second sensor, and select an execution parameter corresponding to the first operation instruction among the at least two execution parameters based on the second information.

In an aspect, if the first information is information of an operation performed on the electronic device by a first user in the current environment, which is obtained through the first sensor, and the second information is portrait information corresponding to the first user obtained through the second sensor, the determining module 402 may be configured to:

determine, based on the operation information, a first operation instruction corresponding to the electronic device;

determine, based on the portrait information, a state of the first user; and select, based on the state of the first user, an execution parameter corresponding to the first operation instruction among the at least two execution parameters.

In another aspect, the determining module 402 may be further configured to determine, based on the second information, a relative distance between a first identifier in the current environment and a first user in the current environment, where the first identifier is used to represent an object with a preset symbol or shape in the current environment; and select a first execution parameter among the at least two execution parameters as an execution parameter corresponding to the first operation instruction, if the relative distance is determined to be greater than a preset distance; otherwise, select a second execution parameter among the at least two execution parameters as an execution parameter corresponding to the first operation instruction; where a value corresponding to the first execution parameter is less than a value corresponding to the second execution parameter.

Optionally, according to the embodiment of the present disclosure, the execution module 403 may be further configured to control a multimedia output device of the electronic device to perform an output operation corresponding to the first operation instruction based on the execution parameter.

Optionally, according to the embodiment of the present disclosure, the execution parameter may include a speed parameter. In this case, the execution module 403 is configured to control at least a part of the electronic device to perform a first operation corresponding to the first operation instruction based on the speed parameter in the execution parameters.

Specifically, the execution module 403 may be further configured to control a motion device of the electronic device to perform, relative to a support surface for the electronic device, a movement operation corresponding to the first operation instruction, based on the speed parameter.

Specifically, a computer program instruction corresponding to the method for processing information according to the embodiments of the disclosure may be stored on a storage medium, such as an optical disk, a hard disk or a USB flash disk. Reading or executing, by an electronic device, the computer program instruction on the storage medium corresponding to the method for processing information, includes:

obtaining environmental information of a current environment;

determining, based on the environmental information, a first operation instruction corresponding to the electronic device and an execution parameter corresponding to the first operation instruction; where the execution parameter is a parameter selected among at least two execution parameters corresponding to the first operation instruction; and controlling the electronic device to perform a first operation corresponding to the first operation instruction based on the execution parameter.

Optionally, executing a computer instruction stored on the storage medium corresponding to a step of determining, based on the environmental information, the first operation instruction corresponding to the electronic device and the execution parameter corresponding to the first operation instruction, includes:

parsing first information in the environmental information;

obtaining first data information and second data information corresponding to the first information;

determining, based on the first data information, a first operation instruction corresponding to the environmental information; and determining, based on the second data information, the execution parameter corresponding to the first operation instruction.

Optionally, the first information is sound information corresponding to a first user in the current environment. Executing a computer instruction stored on the storage medium corresponding to a step of determining, based on the second data information, the execution parameter corresponding to the first operation instruction, includes:

determining, based on the second data information, a mood of the first user; and selecting, based on the mood of the first user, an execution parameter matching the mood of the first user among the at least two execution parameters as the execution parameter corresponding to the first operation instruction.

Optionally, executing a computer instruction stored on the storage medium corresponding to a step of determining, based on the environmental information, the first operation instruction corresponding to the electronic device and the execution parameter corresponding to the first operation instruction, includes:

obtaining, through a first sensor, first information of the current environment, and determining the first operation instruction corresponding to the electronic device; and obtaining, through a second sensor, second information of the current environment, and selecting, based on the second information, the execution parameter corresponding to the first operation instruction among the at least two execution parameters.

Optionally, executing a computer instruction stored on the storage medium corresponding to a step of determining, based on the environmental information, the first operation instruction corresponding to the electronic device and the execution parameter corresponding to the first operation instruction, includes:

determining, based on the information of the operation, a first operation instruction corresponding to the electronic device;

determining, based on the portrait information, a state of the first user; and selecting, based on the state of the first user, an execution parameter corresponding to the first operation instruction among the at least two execution parameters.

Optionally, executing a computer instruction stored on the storage medium corresponding to a step of selecting, based on the second information, the execution parameter corresponding to the first operation instruction among the at least two execution parameters, includes:

determining, based on the second information, a relative distance between a first identifier in the current environment and a first user in the current environment, where the first identifier is used to represent an object with a preset symbol or shape in the current environment; and if the relative distance is determined to be greater than a preset distance, selecting a first execution parameter among the at least two execution parameters as the execution parameter corresponding to the first operation instruction; otherwise, selecting a second execution parameter among the at least two execution parameters as the execution parameter corresponding to the first operation instruction; where a value corresponding to the first execution parameter is less than a value corresponding to the second execution parameter.

Optionally, executing a computer instruction stored on the storage medium corresponding to a step of controlling the electronic device to perform a first operation corresponding to the first operation instruction based on the execution parameter, includes:

controlling a multimedia output device of the electronic device to perform an output operation corresponding to the first operation instruction based on the execution parameter.

Optionally, executing a computer instruction stored on the storage medium corresponding to a step of controlling the electronic device to perform a first operation corresponding to the first operation instruction based on the execution parameter, includes: controlling at least a part of the electronic device to perform the first operation corresponding to the first operation instruction based on the speed parameter in the execution parameters.

Optionally, executing a computer instruction stored on the storage medium corresponding to a step of controlling at least a part of the electronic device to perform a first operation corresponding to the first operation instruction based on the execution parameter, includes:

controlling a motion device of the electronic device to perform, relative to a support surface for the electronic device, a movement operation corresponding to the first operation instruction, based on the speed parameter.

Apparently, those skilled in the art may make various changes and modifications to the disclosure without departing from the spirit and range of the disclosure. In this way, the disclosure is intended to include these changes and modifications which fall within the scope of claims of the disclosure and equivalent technology.

The invention claimed is:

1. A method for processing information performed by an electronic device including at least one sensor and a processor, comprising:

obtaining, by the at least one sensor, environmental information of a current environment;

determining, by the processor, based on the environmental information, a first operation instruction corresponding to an electronic device and an execution parameter corresponding to the first operation instruction, wherein the execution parameter is a parameter selected among at least two execution parameters corresponding to the first operation instruction; and controlling, controlling by the processor, the electronic device to perform a first operation corresponding to the first operation instruction based on the execution parameter.

2. The method according to claim 1, wherein the determining, by the processor, based on the environmental information, the first operation instruction corresponding to the electronic device and the execution parameter corresponding to the first operation instruction, comprises:

parsing first information in the environmental information;

obtaining first data information and second data information corresponding to the first information;

determining, based on the first data information, a first operation instruction corresponding to the environmental information as the first operation instruction corresponding to the electronic device; and determining, based on the second data information, the execution parameter corresponding to the first operation instruction.

3. The method according to claim 2, wherein the first information is sound information corresponding to a first user in the current environment;

and wherein the determining, based on the second data information, the execution parameter corresponding to the first operation instruction, comprises:

determining, based on the second data information, a mood of the first user; and selecting, based on the mood of the first user, an execution parameter matching the mood of the first user among the at least two execution parameters as the execution parameter corresponding to the first operation instruction.

4. The method according to claim 1, the at least one sensor including a first sensor and a second sensor, wherein the determining, by the processor, based on the environmental information, the first operation instruction corresponding to the electronic device and the execution parameter corresponding to the first operation instruction, comprises:

obtaining, through the first sensor, first information of the current environment, and determining the first operation instruction corresponding to the electronic device; and obtaining, through the second sensor, second information of the current environment, and selecting, based on the second information, the execution parameter corresponding to the first operation instruction among the at least two execution parameters.

5. The method according to claim 4, wherein the first information is information of an operation performed on the electronic device by a first user in the current environment, which is obtained through the first sensor, and the second information is portrait information corresponding to the first user obtained through the second sensor;

wherein the obtaining, through the first sensor, the first information of the current environment, and determining the first operation instruction corresponding to the electronic device, comprises:

determining, based on the information of the operation, the first operation instruction corresponding to the electronic device; and wherein the selecting, based on the second information, the execution parameter corresponding to the first operation instruction among the at least two execution parameters, comprises:

determining, based on the portrait information, a state of the first user, and selecting, based on the state of the first user, the execution parameter corresponding to the first operation instruction among the at least two execution parameters.

6. The method according to claim 4, wherein the selecting, based on the second information, the execution parameter corresponding to the first operation instruction among the at least two execution parameters, comprises:

determining, based on the second information, a relative distance between a first identifier in the current environment and a first user in the current environment, wherein the first identifier is to represent an object with a preset symbol or shape in the current environment; and if the relative distance is determined to be greater than a preset distance, selecting a first execution parameter among the at least two execution parameters as the execution parameter corresponding to the first operation instruction; if the relative distance is determined to be not greater than the preset distance, selecting a second execution parameter among the at least two execution parameters as the execution parameter corresponding to the first operation instruction; wherein a value corresponding to the first execution parameter is less than a value corresponding to the second execution parameter.

7. The method according to claim 1, wherein the controlling, by the controller, the electronic device to perform the first operation corresponding to the first operation instruction based on the execution parameter comprises:

controlling a multimedia output device of the electronic device to perform an output operation corresponding to the first operation instruction based on the execution parameter.

8. The method according to claim 1, wherein the execution parameter comprises a speed parameter, and wherein the controlling, by the controller, the electronic device to perform the first operation corresponding to the first operation instruction based on the execution parameter comprises:

controlling at least a part of the electronic device to perform the first operation corresponding to the first operation instruction based on the speed parameter in the execution parameter.

9. The method according to claim 8, wherein the controlling at least a part of the electronic device to perform the first operation corresponding to the first operation instruction based on the execution parameter comprises:
controlling a motion device of the electronic device to perform, relative to a support surface for the electronic device, a movement operation corresponding to the first operation instruction, based on the speed parameter.

10. An electronic device, comprising:
a housing;
a sensor configured to obtain environmental information of a current environment outside the housing; and
a processor which is provided inside the housing, connected to the sensor, and configured to receive and process the environmental information, determine a first operation instruction corresponding to the electronic device, select an execution parameter among at least two execution parameters corresponding to the first operation instruction as an execution parameter corresponding to the first operation instruction, and control the electronic device to perform a first operation corresponding to the first operation instruction based on the execution parameter.

11. The electronic device according to claim 10, wherein the sensor comprises a first sensor and a second sensor;
the first sensor is configured to obtain first information of the current environment;
the second sensor is configured to obtain second information of the current environment; and
the processor is configured to determine the first operation instruction corresponding to the electronic device based on the first information, and determine the execution parameter corresponding to the first operation instruction based on the second information.

12. The electronic device according to claim 11, further comprising:
a motion device, which is connected to the processor and configured to perform the first operation corresponding to the first operation instruction based on the execution parameter.

13. The electronic device according to claim 10, further comprising:
a multimedia output device, which is connected to the processor and configured to output information corresponding to the first operation instruction based on the execution parameter.

14. The electronic device according to claim 13, further comprising:
a motion device, which is connected to the processor and configured to perform the first operation corresponding to the first operation instruction based on the execution parameter.

15. The electronic device according to claim 10, further comprising:
a motion device, which is connected to the processor and configured to perform the first operation corresponding to the first operation instruction based on the execution parameter.

16. The electronic device according to claim 15, wherein the motion device is configured to perform, relative to a support surface for the electronic device, a movement operation, based on a speed parameter in the execution parameter.

17. An electronic device, comprising:
at least one sensor configured to obtain environmental information of a current environment;
a processor configured to:
determine, based on the environmental information, a first operation instruction corresponding to the electronic device and an execution parameter corresponding to the first operation instruction, wherein the execution parameter is a parameter selected among at least two execution parameters corresponding to the first operation instruction; and
control the electronic device to perform a first operation corresponding to the first operation instruction based on the execution parameter.

* * * * *